(12) United States Patent
Suzuki et al.

(10) Patent No.: US 11,808,935 B2
(45) Date of Patent: Nov. 7, 2023

(54) ENDOSCOPE AND ENDOSCOPE APPARATUS

(71) Applicant: OLYMPUS CORPORATION, Tokyo (JP)

(72) Inventors: Takeo Suzuki, Hachioji (JP); Isamu Nakajima, Sagamihara (JP); Shoichiro Mochimaru, Fuchu (JP)

(73) Assignee: OLYMPUS CORPORATION, Tokyo (JP)

( * ) Notice: Subject to any disclaimer, the term of this patent is extended or adjusted under 35 U.S.C. 154(b) by 0 days.

(21) Appl. No.: 17/499,145

(22) Filed: Oct. 12, 2021

(65) Prior Publication Data

US 2023/0110332 A1    Apr. 13, 2023

(51) Int. Cl.
G02B 23/24    (2006.01)
G02B 5/04    (2006.01)
G02B 23/04    (2006.01)
H04N 23/80    (2023.01)

(52) U.S. Cl.
CPC .............. *G02B 23/243* (2013.01); *G02B 5/04* (2013.01); *G02B 23/04* (2013.01); *H04N 23/80* (2023.01)

(58) Field of Classification Search
None
See application file for complete search history.

(56) References Cited

U.S. PATENT DOCUMENTS

| | | |
|---|---|---|
| 9,254,078 B2 | 2/2016 | McDowall |
| 2015/0002646 A1* | 1/2015 | Namii .................. G02B 23/2415 348/65 |
| 2015/0309284 A1* | 10/2015 | Kagawa ............. G02B 23/2423 348/76 |
| 2019/0265490 A1* | 8/2019 | Duckett, III ........ A61B 1/00009 |
| 2021/0243376 A1* | 8/2021 | Yoshino ............... H04N 5/2254 |

FOREIGN PATENT DOCUMENTS

| | | |
|---|---|---|
| JP | 5393926 B2 | 1/2014 |
| JP | 2014-524290 A | 9/2014 |
| JP | 5593004 B2 | 9/2014 |

OTHER PUBLICATIONS

English abstract only of US 2013/235174 A1.
English abstract only of WO 2013/025530 A1.
English abstract only of US 2014/176692 A1.

* cited by examiner

*Primary Examiner* — Shadan E Haghani
(74) *Attorney, Agent, or Firm* — Scully, Scott, Murphy & Presser, P.C.

(57) ABSTRACT

An endoscope includes an objective optical system provided in a distal end portion of an insertion portion, and a light splitting element configured to split a light beam from an objective optical system into a plurality of light beams including a first light beam and a second light beam. The first light beam is reflected by a reflection mirror, and is formed into an image on a first image pickup device. The second light beam is formed into an image on a second image pickup device. The first image pickup device and the second image pickup device are disposed adjacent to the light splitting element at positions different from each other with respect to an optical axis of the light beam from the objective optical system.

12 Claims, 6 Drawing Sheets

ENDOSCOPE AND ENDOSCOPE APPARATUS

BACKGROUND OF THE INVENTION

1. Field of the Invention

The present invention relates to an endoscope and an endoscope apparatus which split a light beam from an objective optical system into a plurality of light beams to pick up a plurality of images.

2. Description of the Related Art

Conventionally, there has been a known technique for generating a composite image with an extended depth of field, referred to as EDOF (extended depth of field). In EDOF, a light beam from an objective optical system is split into a plurality of (two, for example) light beams by a splitting optical system, such as a prism, and the plurality of light beams are respectively given different optical paths to form a plurality of optical images having different depths of field. The plurality of formed optical images are picked up by image pickup devices, so that a plurality of images having different focus positions are generated, and a composite image is generated by combining the plurality of images such that the composite image includes focused portions of the respective images.

There are endoscopes which employ an EDOF technique. In a normal endoscope, a depth of field is reduced when an attempt is made to increase maximum magnification by performing close-up observation, and the maximum magnification is reduced when an attempt is made to extend a depth of field. In an endoscope which employs the EDOF technique, both an increase in maximum magnification and extension of a depth of field can be achieved.

For example, Japanese Patent No. 5393926 describes an image pickup apparatus where a light beam from an objective optical system is split into two light beams by a splitting element; the two light beams are given different optical paths, and the two light beams are respectively formed into images in different regions of one image pickup device.

SUMMARY OF THE INVENTION

One aspect of the present invention is directed to an endoscope including: a distal end portion disposed on a distal end side of an insertion portion inserted into an object from a distal end; an objective optical system provided in the distal end portion, and configured to change light from the object into a light beam to form an image; a light splitting element disposed in the distal end portion at a position closer to a proximal end side than the objective optical system; and configure to split the light beam from the objective optical system into a plurality of light beams including a first light beam and a second light beam; a reflection mirror configured to reflect the first light beam by causing the first light beam to return, the first light beam being obtained through splitting by the light splitting element; a first image pickup device on which the first light beam reflected by the reflection mirror is formed into an image, the first image pickup device being disposed adjacent to the light splitting element; and a second image pickup device on which the second light beam obtained through splitting by the light splitting element is formed into an image, the second image pickup device being disposed adjacent to the light splitting element at a position different from the first image pickup device with respect to an optical axis of the light beam from the objective optical system.

Another aspect of the present invention is directed to an endoscope apparatus including: an endoscope which includes a distal end portion disposed on a distal end side of an insertion portion inserted into an object from a distal end, an objective optical system provided in the distal end portion, and configured to change light from the object into a light beam to form an image, a light splitting element disposed in the distal end portion at a position closer to a proximal end side than the objective optical system, and configure to split the light beam from the objective optical system into a plurality of light beams including a first light beam and a second light beam, a reflection mirror configured to reflect the first light beam by causing the first light beam to return, the first light beam being obtained through splitting by the light splitting element, a first image pickup device on which the first light beam reflected by the reflection mirror is formed into an image, the first image pickup device being disposed adjacent to the light splitting element, and a second image pickup device on which the second light beam obtained through splitting by the light splitting element is formed into an image, the second image pickup device being disposed adjacent to the light splitting element at a position different from the first image pickup device with respect to an optical axis of the light beam from the objective optical system; and a processor which is connectable with the endoscope, the processor being configured to generate a first image from a first image pickup signal obtained through image pickup performed by the first image pickup device, generate a second image from a second image pickup signal obtained through image pickup performed by the second image pickup device, and combine the first image and the second image with each other.

DETAILED DESCRIPTION OF THE PREFERRED EMBODIMENTS

Figure 1:
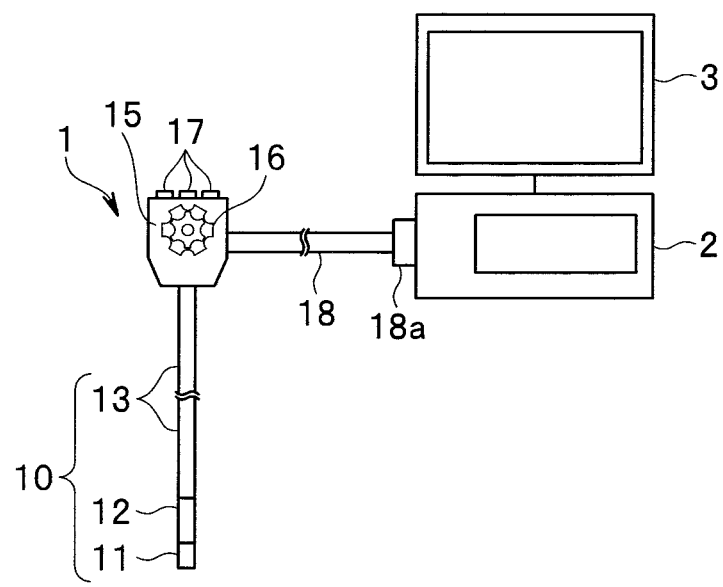
FIG. 1 is a view showing a constitutional example of an endoscope apparatus according to a first embodiment of the present invention.

Hereinafter, embodiments of the present invention will be described with reference to drawings. However, the present invention is not limited by the embodiments described hereinafter. In the drawings, identical or corresponding elements are given the same reference symbols when appropriate. In respective drawings used in the description made hereinafter, to allow respective constitutional elements to have sizes which are visible in the drawings, each constitutional element may have a different scale. The present invention is not limited to the number of constitutional elements, the shape of the constitutional elements, size ratios of the constitutional elements, or relative positional relationships between the respective constitutional elements described in the respective drawings.

First Embodiment

FIG. 1 to FIG. 5 are views showing a first embodiment of the present invention. FIG. 1 is a view showing a constitutional example of an endoscope apparatus.

As shown in FIG. 1, the endoscope apparatus includes an endoscope 1, a processor 2, and a monitor 3.

The endoscope 1 includes an elongated insertion portion 10, an operation portion 15, and a universal cable 18, the insertion portion 10 being inserted into an object from a distal end, the operation portion 15 being continuously provided to a proximal end side of the insertion portion 10, the universal cable 18 extending from the operation portion 15. An object into which the insertion portion 10 is inserted may be a living object, such as a person or an animal, or may be a non-living object, such as a machine or a building.

The insertion portion 10 includes a distal end portion 11 (distal end chip), a bending portion 12, and a tubular member 13 which are continuously provided in that order from a distal end toward a proximal end of the insertion portion 10.

As will be described later with reference to FIG. 2 and the like, an image pickup unit 21, an illumination optical system 24 and the like are provided in the distal end portion 11. In other words, the endoscope 1 of the present embodiment is an electronic endoscope, for example.

The bending portion 12 is configured to be bendable in two directions or in four directions of upward, downward, leftward, and rightward directions, for example. When the bending portion 12 is bent, a direction of the distal end portion 11 changes, so that an observation direction of the image pickup unit 21 changes. The bending portion 12 is also bent for increasing ease of insertion of the insertion portion 10 in an object.

The tubular member 13 is a tubular portion which couples a proximal end of the bending portion 12 and a distal end of the operation portion 15. The tubular member 13 may have a rigid mode in which the insertion portion 10 does not deflect, or may have a flexible mode in which the insertion portion 10 deflects according to a shape of an object into which the insertion portion 10 is inserted. An endoscope which has a rigid insertion portion mode is generally referred to as a rigid endoscope, and an endoscope which has a flexible insertion portion mode is generally referred to as a flexible endoscope. For example, a rigid endoscope and a flexible endoscope in the medical field are defined in ISO08600-1: 2015.

The operation portion 15 is a portion which is continuously provided to a proximal end side of the insertion portion 10, and which is gripped by the hand to perform various operations relating to the endoscope 1. The operation portion 15 includes, for example, a bending operation lever 16 and a plurality of operation buttons 17.

Figure 2:
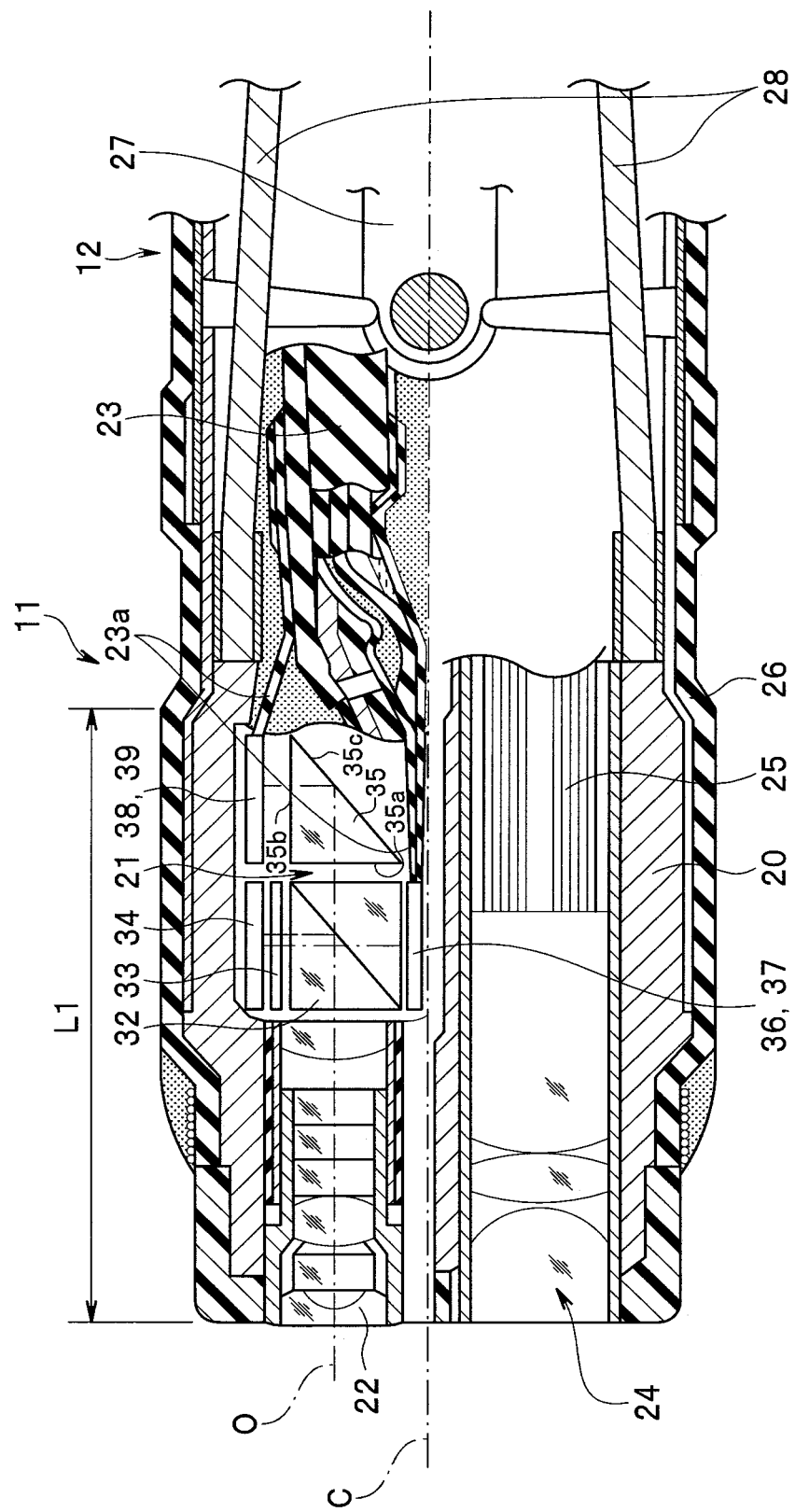
FIG. 2 is a cross-sectional view showing one example of an arrangement of an image pickup unit provided in a distal end portion of an insertion portion in the above-mentioned first embodiment.
Figure 3:
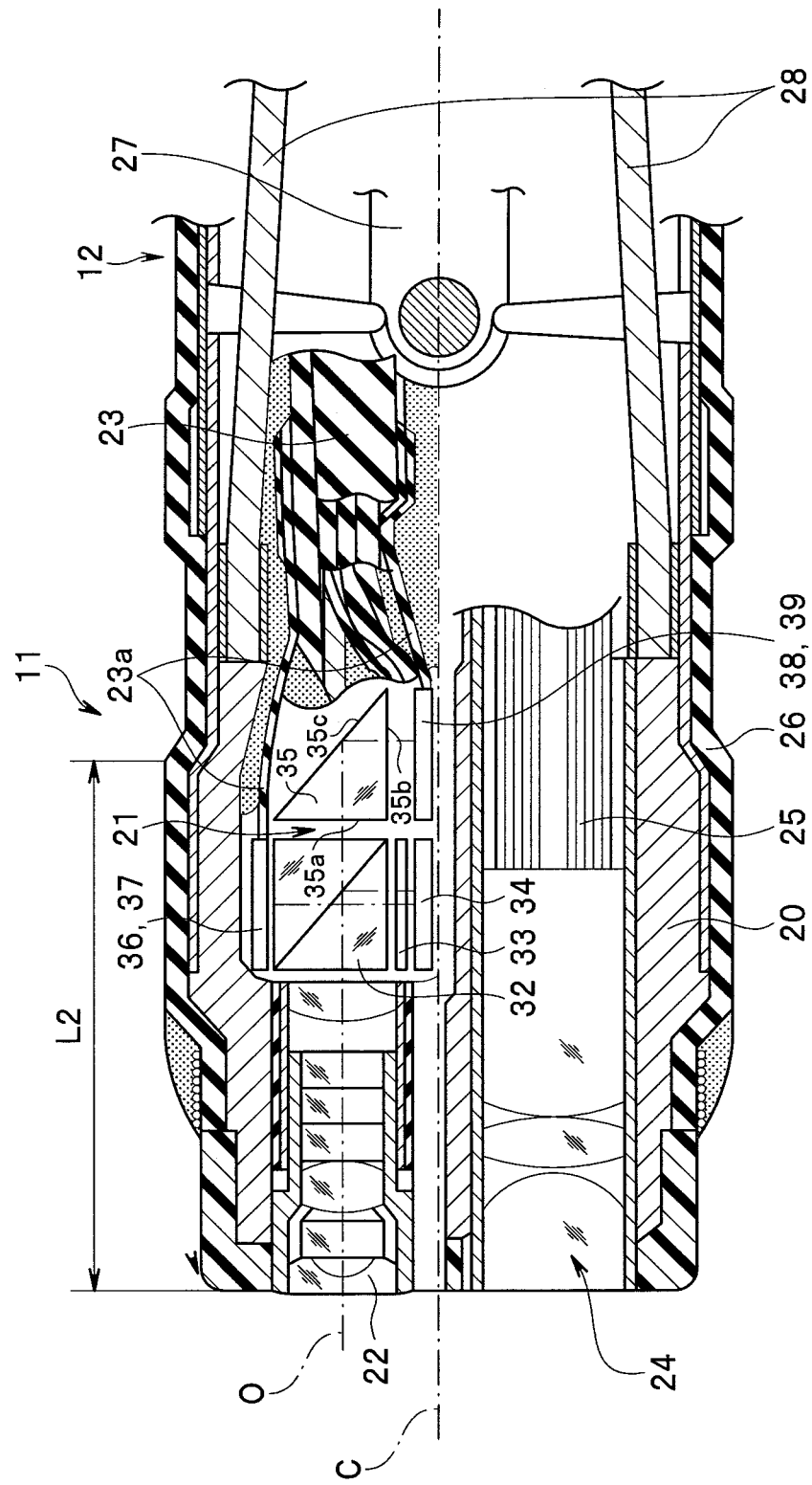
FIG. 3 is a cross-sectional view showing another example of the arrangement of the image pickup unit provided in the distal end portion of the insertion portion in the above-mentioned first embodiment.

The bending operation lever 16 is connected to the bending portion 12 via bending wires 28 provided to extend from an inside of the operation portion 15 to an inside of the insertion portion 10 (see FIG. 2, FIG. 3, or the like). When the bending operation lever 16 is rotationally operated, for example, the bending wires 28 are pulled, so that the bending portion 12 is bent.

The plurality of operation buttons 17 include an air/water feeding button, a suction button, and a switch, for example. The air/water feeding button is an operation button for feeding air/water toward the distal end portion 11 via a treatment instrument channel not shown in the drawing, for example. The suction button is an operation button for performing suction from the distal end portion 11 via the treatment instrument channel, for example. The switch is a button switch for performing an operation mainly relating to an image pickup, for example.

The universal cable 18 is a connection cable for connecting the endoscope 1 to the processor 2. A connector 18a is provided at an extension end of the universal cable 18. A signal cable 23 and an optical fiber cable 25 (see FIG. 2, FIG. 3, or the like) are provided in the insertion portion 10, the operation portion 15, and the universal cable 18 of the endoscope 1.

The processor 2 in the present embodiment serves as both an image processing device and a light source device, for example (however, a light source device may be configured separately from the processor 2).

A light source device part of the processor 2 includes a plurality of light sources, a light source control circuit, and an optical system, the plurality of light sources emitting illumination light, such as white light or light for special observation, the light source control circuit controlling the light sources, the optical system collecting light emitted from the light sources at an incident end of the optical fiber cable 25. In place of a configuration where illumination light is supplied to the endoscope 1 from the light source device, a configuration may be adopted where a light emitting element disposed at the distal end portion 11 emits illumination light.

An image processing device part of the processor 2 is configured such that, for example, an ASIC (application specific integrated circuit) including a CPU (central processing unit), or a hardware processor, such as an FPGA (field programmable gate array) reads a computer program (software) stored in a non-transitory computer readable storage device, such as ROM (read-only memory) (or are HDD (hard disk drive), an SSD (solid state drive), or a disk-shaped recording medium), and develops and executes the computer program in RAM to achieve the whole or a part of functions of respective units. However, the configuration is not limited to the above. For example, the image processing device part of the processor 2 may be configured such that the whole or a part of the functions of the respective units is achieved by a dedicated electronic circuit.

Further, the image processing device part of the processor 2 may also be configured to achieve a function of the light source control circuit of the light source device part of the processor 2.

By connecting the connector 18a to a connector receiver of the processor 2, the endoscope 1 and the processor 2 are electrically and optically connected with each other. With such connection, the processor 2 and the image pickup unit 21 are electrically connected with each other via the signal cable 23, and illumination light can be transmitted to the distal end portion 11 via the optical fiber cable 25.

The processor 2 transmits a drive signal and power to the image pickup unit 21, and receives and performs processing on an image pickup signal obtained by the image pickup unit 21. Image processing performed by the image processing device part of the processor 2 includes first image processing and second image processing. In the first image processing, a plurality of image pickup signals obtained by a plurality of image pickup devices (described later) in the image pickup unit 21 are respectively converted into a plurality of image signals. In the second image processing, a composite image with an extended depth of field is generated from the plurality of image signals obtained by the first image processing.

The first image processing is processing where various kinds of processing, such as demosaicking, noise correction, color correction, contrast correction, and gamma correction, are performed on an image pickup signal outputted from the image pickup unit 21 to convert the image pickup signal into an image signal which can be displayed. The second image processing is field depth extending processing which is referred to as an EDOF (extended depth of field), and will be described later with reference to FIG. 5.

The monitor 3 displays the image signal on which processing is performed by the processor 2. Therefore, an endoscope image (an endoscope image with an extended depth) is displayed on the monitor 3.

FIG. 2 is a cross-sectional view showing one example of an arrangement of the image pickup unit 21 provided in the distal end portion 11 of the insertion portion 10.

The distal end portion 11 includes a rigid distal end portion body 20 which is covered by an outer skin 26, The image pickup unit 21 and the illumination optical system 24 are provided in the distal end portion body 20. The illumination optical system 24 irradiates an object with illumination light which is transmitted from the processor 2 via the optical fiber cable 25.

Figure 4:
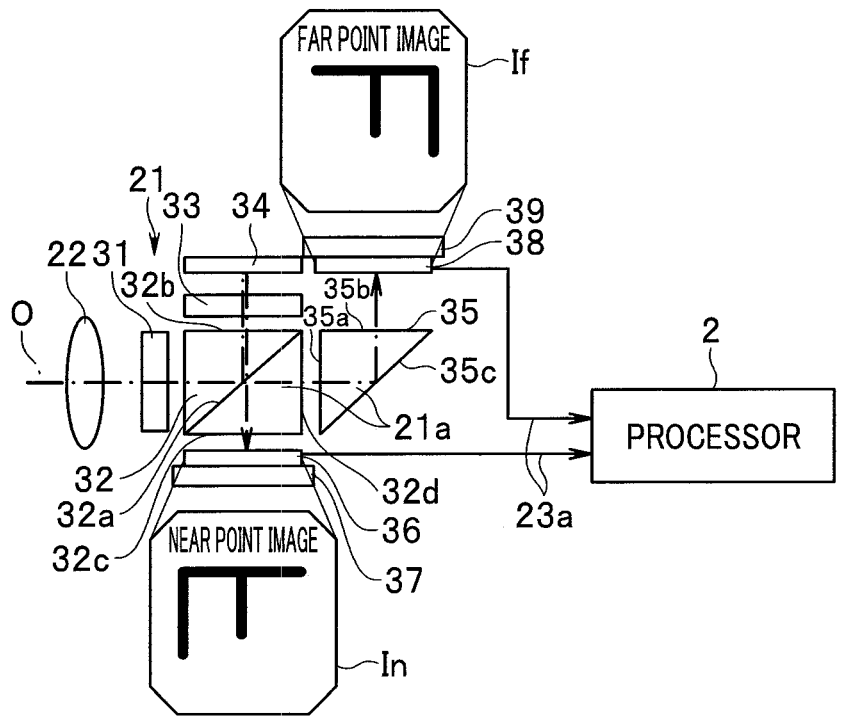
FIG. 4 is a view showing a constitutional example of the image pickup unit in the above-mentioned first embodiment.

As shown in FIG. 4, the image pickup unit 21 includes an objective optical system 22, a light splitting element 21a (splitting optical system), a first image pickup device 36, a first substrate 37, a second image pickup device 38, and a second substrate 39. A solid-state image pickup device, such as a CCD image sensor or a CMOS image sensor, is preferably used for each of the first image pickup device 36 and the second image pickup device 38.

The first image pickup device 36 is mounted on the first substrate 37, and the second image pickup device 38 is mounted on the second substrate 39. The first image pickup device 36 is connected to a signal line 23a via the first substrate 37, and the second image pickup device 38 is connected to a signal line 23a via the second substrate 39.

The signal line 23a connected to the first substrate 37 extends toward a proximal end side from an area below the light splitting element 21a in FIG. 4 (from an area near to a center line C of the distal end portion 11 in FIG. 2). The signal line 23a connected to the second substrate 39 extends toward a proximal end side from an area above the light splitting element 21a in FIG. 4 (from an area far from the center fin C of the distal end portion 11 in FIG. 2).

A plurality of signal lines including the signal line 23a connected to the first substrate 37 and the signal line 23a connected to the second substrate 39 are collected as one signal cable 23 at the proximal end side, and the signal cable 23 is connected to the processor 2 through the inside of the endoscope 1. The processor 2 transmits a drive signal and power to each of the first image pickup device 36 and the second image pickup device 38 via the signal lines 23a, and receives a first image pickup signal from the first image pickup device 36 and a second image pickup signal from the second image pickup device 38.

Further, a plurality of bending pieces 27 are provided in the bending portion 12 which is disposed on a proximal end side of the distal end portion 11, The distal end portion body 20 is rotatably connected with the bending piece 27 which is disposed at a distal end, and distal ends of the bending wires 28 are connected to the distal end portion body 20, for example.

A configuration of the image pickup unit 21 will be further described with reference to FIG. 4. FIG. 4 is a view showing a constitutional example of the image pickup unit 21.

The objective optical system 22 changes light from an object (reflected light of illumination light which is reflected from the object, fluorescence from the object and the like) into a light beam to form images on the first image pickup device 36 and the second image pickup device 38.

A depolarization plate 31 is provided between the objective optical system 22 and the light splitting element 21a. The depolarization plate 31 is an optical element that eliminates deviation in a polarization direction.

The light splitting element 21a is disposed in the distal end portion 11 at a position closer to the proximal end side than the objective optical system 22, The light splitting element 21a splits a light beam from the objective optical system 22 into a plurality of light beams including a first light beam and a second light beam.

The light splitting element 21a in the present embodiment includes a first reflection prism 32 and a second reflection prism 35. The first reflection prism 32 is obtained through bonding of a plurality of (two, for example) surfaces of a plurality of (two, for example) triangular prisms. The second reflection prism 35 reflects the second light beam, which is allowed to pass through the first reflection prism 32, in a direction different from a direction in which the first image pickup device 36 is disposed, to form an image on the second image pickup device 38.

The first reflection prism 32 is configured as a polarization beam splitter, for example. The first reflection prism 32 has a polarization beam splitter surface 32a, a light emitting/incident surface 32b, a first light emitting surface 32c, and a second light emitting surface 32d.

The polarization beam splitter surface 32a is a bonding surface where two triangular prisms are bonded to each other. The polarization beam splitter surface 32a is disposed to be inclined at an angle of 45°, for example, with respect to an optical axis O of a light beam from the objective optical system 22. The polarization beam splitter surface 32a separates incident light into an S-polarized light component and a. P-polarized light component being two linearly polarized light components. In the incident light on the polarization beam splitter surface 32a, deviation in the polarization direction is eliminated by the above-mentioned depolarization plate 31 and hence, the incident light is separated into the S-polarized light component and the P-polarized light component with substantially equal quantities of light, in the present embodiment, it is assumed that the polarization beam splitter surface 32a reflects an S-polarized light component (a first light beam reflected by the light splitting element 21a) of linearly polarized light, and allows a P-polarized light component (second light beam) of the linearly polarized light to pass through the polarization beam splitter surface 32a.

The S-polarized light component reflected by the polarization beam splitter surface 32a is emitted from the light emitting/incident surface 32b. A wavelength plate 33 and a reflection mirror 34 are provided on an optical path of the light beam which is emitted from the light emitting/incident surface 32b.

Assuming a wavelength as λ, the wavelength plate 33 is configured as a λ/4 plate. The λ/4 plate converts linearly polarized light into circularly polarized light, or converts circularly polarized light into linearly polarized light. Accordingly, the S-polarized light component which is incident on the wavelength plate 33 is converted into circularly polarized light.

The reflection mirror 34 reflects the circularly polarized light toward the wavelength plate 33 by causing the circularly polarized light to return. The wavelength plate 33 converts incident light from the circularly polarized light into a P-polarized light component of linearly polarized light. The P-polarized light component from the wavelength plate 33 is incident from the light emitting/incident surface 32b, is allowed to pass through the polarization beam splitter surface 32a, and is emitted from the first light emitting surface 32c, The light beam emitted from the first light emitting surface 32c is formed into an image on a first image pickup surface of the first image pickup device 36, which is provided on an optical path and adjacent to the first light emitting surface 32c of the light splitting element 21a.

In contrast, the P-polarized light component (second light beam) which is incident from the objective optical system 22 side and is allowed to pass through the polarization beam splitter surface 32a is emitted from the second light emitting surface 32d.

The second reflection prism 35 has a first surface 35a, a second surface 35b, and a third surface 35c. The first surface 35a perpendicularly intersects with the optical axis O of the light beam from the objective optical system 22. The second surface 35b is parallel to the optical axis O along the optical axis O. The third surface 35c is disposed to be inclined at an angle of 45°, tier example, with respect to the optical axis O, thus intersecting with the optical axis O. In FIG. 2 to FIG. 4 (and FIG. 6 and FIG. 7 of an embodiment which will be described later), the first reflection prism 32 and the second reflection prism 35 are separately illustrated. However, in an actual product, the second light emitting surface 32d of the first reflection prism 32 and the first surface 35a of the second reflection prism 35 are bonded by a transparent adhesive agent with a predetermined refractive index, for example.

The light beam emitted from the second light emitting surface 32d is incident on the second reflection prism 35 from the first surface 35a, is reflected on the third surface 35c being a mirror surface, and is then emitted from the second surface 35b. The light beam emitted from the second surface 35b is formed into an image on a second image pickup surface of the second image pickup device 38, which is provided on the optical path and adjacent to the second surface 35b of the light splitting element 21a.

The second image pickup device 38 is disposed at a position different from a position of the first image pickup device 36 with respect to the optical axis O of the light beam from the objective optical system 22. Specifically, the second image pickup device 38 is disposed on a side opposite to the first image pickup device 36 with respect to the optical axis O. As a result, the first image pickup surface of the first image pickup device 36 is disposed to face one surface (the first light emitting surface 32c in the present embodiment) of two surfaces of the light splitting element 21a, the two surfaces opposing each other with the optical axis O of the light beam from the objective optical system 22 interposed between the two surfaces. The second image pickup surface of the second image pickup device 38 is disposed to face the other surface (a surface including the light emitting/incident surface 32b and the second surface 35b in the present embodiment) of the two surfaces. Further, the second image pickup device 38 and the reflection mirror 34 are disposed adjacent to each other.

The first image pickup device 36 and the second image pickup device 38 are disposed at positions where a first optical path length from the objective optical system 22 to the first image pickup device 36 is different from a second optical path length from the objective optical system 22 to the second image pickup device 38. Accordingly, a focus position of the first image pickup device 36 is different from a focus position of the second image pickup device 38.

In the present embodiment, it is assumed that, as shown in FIG. 4, the first image pickup device 36 and the second image pickup device 38 are disposed such that the first image pickup device 36 picks up a near point image and outputs a first image pickup signal, and the second image pickup device 38 picks up a far point image and outputs a second image pickup signal.

The processor 2 generates a first image from the first image pickup signal outputted from the first image pickup device 36, and generates a second image from the second image pickup signal outputted from the second image pickup device 38.

As described above, the light beam that is to be incident on the first image pickup device 36 is reflected by the polarization beam splitter surface 32a and the reflection mirror 34, that is, reflected two times, and the light beam that is to be incident on the second image pickup device 38 is reflected by the third surface 35c, that is, reflected one time. Therefore, an optical image which is formed on the first image pickup device 36 is horizontally inverted compared to an optical image which is formed on the second image pickup device 38.

Accordingly, the processor 2 performs processing of eliminating mirror symmetry by horizontally inverting one of the first image generated from the first image pickup signal and the second image generated from the second image pickup signal.

Depending on a configuration of an optical system, the first image pickup device 36 and the second image pickup device 38 may differ in a side of the image pickup device on which an upper side of a formed image of an object is disposed. In such a case, the processor 2 performs processing of aligning upper sides of the images by rotating at least one image.

As described above, the processor 2 performs processing of aligning a direction of the first image and a direction of the second image by performing image inversion processing or image rotation processing, for example.

Further, positional deviation, a difference in magnification, distortion or the like may occur between the first image and the second image due to a design of an optical system, accuracy of the optical system, assembly accuracy of the image pickup device to the optical system or the like. In this case, it is sufficient that the processor 2 perform electric image processing, such as positional deviation correction by parallel movement, magnification correction by zooming in or out, or distortion correction, on at least one image.

In addition, the first image and the second image may differ in image brightness or white balance (color tone). In this case, it is sufficient that the processor 2 perform electric image processing, such as brightness correction or white balance correction, on at least one image.

It is preferable that various parameters or the like used for the above-mentioned image processing be set in the image processing device part of the processor 2 when the endoscope apparatus is turned on.

After the first image processing is performed on the first image and the second image, the processor 2 combines the first image and the second image with each other by the second image processing.

When the first image pickup device 36 and the second image pickup device 38 are driven simultaneously, noise generated from the first image pickup device 36 may affect the second image pickup device 38, and noise generated from the second image pickup device 38 may affect the first image pickup device 36. For this reason, drive timing of the first image pickup device 36 and drive timing of the second image pickup device 38 may be slightly offset to reduce mutual influence of noise. In this case, it is preferable that the processor 2 temporarily store, in a frame buffer, an image signal obtained by performing the first image processing on an image pickup signal which is read at early timing, and the processor 2 combine the image signal with an image signal obtained by performing the second image processing on an image pickup signal which is read at later timing.

The processor 2 generates a composite image having a larger depth of field than the first image and the second image by combining the first image and the second image in the second image processing such that the composite image includes a focused portion in the first image and a focused portion in the second image, the focused portion in the second image being different from the focused portion in the first image in respect of a focused region.

Figure 5:
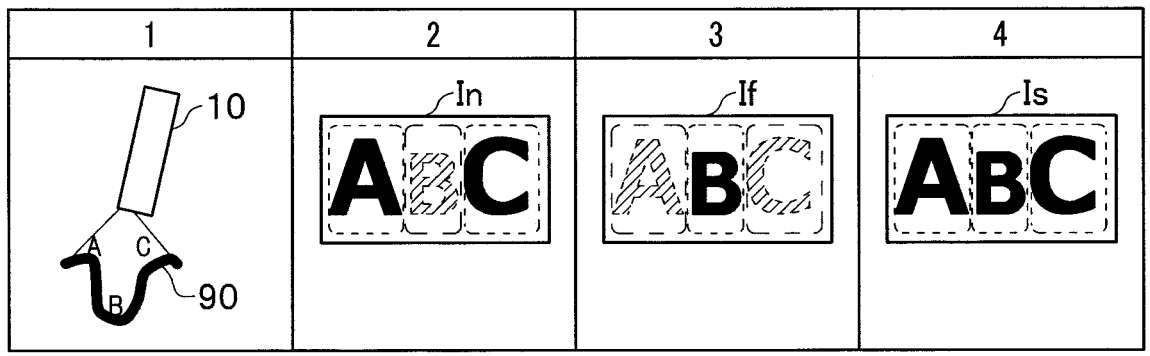
FIG. 5 is a diagram showing an example of a composite image generated by the endoscope apparatus of the above-mentioned first embodiment.

FIG. 5 is a diagram showing an example of the composite image generated by the endoscope apparatus.

A first column in FIG. 5 shows an example of a positional relationship between the insertion portion 10 of the endoscope 1 and an object 90. In the object 90, an object portion "B" disposed at the center has a larger distance from the distal end of the insertion portion 10 than an object portion "A" disposed on the left side of "B" and an object portion "C" disposed on the right side of "B".

A second column in FIG. 5 shows an example of a near point image In. In the near point image In, the object portions "A", "C" which are near to the distal end of the insertion portion 10 are focused, and the object portion "B" which is far from the distal end of the insertion portion 10 is blurred.

A third column in FIG. 5 shows an example of a far point image If. In the far point image If, the object portions "A", "C" which are near to the distal end of the insertion portion 10 are blurred, and the object portion "B" which is far from the distal end of the insertion portion 10 is focused.

A fourth column in FIG. 5 shows an example of a composite image Is. The processor 2 generates the composite image Is, where the object portions "A", "B", "C" are focused, by combining the near point image In and the far point image If with each other such that the composite image Is includes the focused object portions "A", "C" in the near point image In and the focused object portion "B" in the far point image If.

FIG. 3 is a cross-sectional view showing another example of the arrangement of the image pickup unit 21 provided in the distal end portion 11 of the insertion portion 10.

In both examples of the arrangement shown in FIG. 2 and FIG. 3, the optical axis O of the light beam from the objective optical system 22 is disposed to be offset from the center line C of the distal end portion 11. In the example of the arrangement shown in FIG. 2, the second reflection prism 35 is disposed such that, as viewed from the center line C, the third surface 35c is disposed inward in a radial direction and the second surface 35b is disposed outward in the radial direction. The third surface 35c reflects light outward in the radial direction about the center line C.

In contrast, in the example of the arrangement shown in FIG. 3, the second reflection prism 35 is disposed such that, as viewed from the center line C, the third surface 35c is disposed outward in the radial direction and the second surface 35b is disposed inward in the radial direction. The third surface 35c reflects light inward in the radial direction about the center line C.

The first image pickup device 36, the second image pickup device 38, the wavelength plate 33 and the like are disposed at a portion where the light splitting element 21a is provided and hence, such a portion forms a large diameter portion of the distal end portion 11.

The first reflection prism 32 has a quadrangular shape as viewed in a side view. However, the second reflection prism 35 has a triangular shape as viewed in a side view, so that a space is present outward of the third surface 35c.

When the arrangement shown in FIG. 3 is adopted, the signal line 23a can be disposed in the space outside the third surface 35c and hence, a length L2 of the distal end portion 11 from a distal end surface to a proximal end of the large diameter portion can be set smaller than a length L1 in the configuration shown in FIG. 2 (that is, L2<L1), With such a configuration, it is possible to reduce influence of the large diameter portion of the distal end portion 11 on bendability of the bending portion 12 and hence, ease of insertion of the insertion portion 10 can be increased.

In the image pickup unit 21 shown in FIG. 4, the first image pickup device 36 mounted on the first substrate 37 and the second image pickup device 38 mounted on the second substrate 39 are assembled to the light splitting element 21a as follows, for example.

First, the first reflection prism 32 and the second reflection prism 35 are bonded to each other to form the light splitting element 21a. Thereafter, the first image pickup device 36 and the second image pickup device 38 are bonded to the light splitting element 21a by adhesion or the like.

Alternatively, the light splitting element 21a may be configured such that the first image pickup device 36 is bonded to the first reflection prism 32 and the second image pickup device 38 is bonded to the second reflection prism 35 and, thereafter, the first reflection prism 32 and the second reflection prism 35 are bonded to each other.

It is sufficient that the wavelength plate 33 and the reflection mirror 34 be bonded to the first reflection prism 32 or the light splitting element 21a by adhesion or the like at a suitable point of time after the wavelength plate 33 and the reflection mirror 34 are bonded to each other, for example.

For the signal lines 23a which are conducted to the first image pickup device 36 and the second image pickup device 38, metal wires, such as copper wires, may be used, or waveguides may be used which are formed by covering a silicone resin, forming a core, with a conductive foil or a braided wire. In a case where a waveguide is used, a configuration may be adopted where a signal from the first image pickup device 36 and a signal from the second image pickup device 38 are transmitted by one waveguide (see an example shown in FIG. 8 and FIG. 9 described later, where the first image pickup device 36 and the second image pickup device 38 are mounted on the same substrate).

Assuming that, in the configuration shown in FIG. 4, the first image pickup device 36 is disposed on a lower surface of the light splitting element 21a and the second image pickup device 38 is disposed on an upper surface of the light splitting element 21a, one of two signal lines 23a which are respectively conducted to the first image pickup device 36 and the second image pickup device 38 may be disposed on a right side surface or a left side surface of the light splitting element 21a. Alternatively, one of the two signal lines 23a may be disposed on a right side surface of the light splitting element 21a, and the other of the two signal lines 23a may be disposed on a left side surface of the light splitting element 21a.

Further, the first image pickup device 36 may be disposed on the lower surface of the light splitting element 21a, and the second image pickup device 38 may be disposed on the right side surface or the left side surface of the light splitting element 21a In this case, it is sufficient to adopt a configuration where the second reflection prism 35 is disposed laterally to reflect a light beam to the right side surface or the left side surface.

Alternatively, the first image pickup device 36 may be disposed on the upper surface of the light splitting element 21a, and the second image pickup device 38 may be disposed on the right side surface or the left side surface of the light splitting element 21a. In this case, it is sufficient to adopt a configuration where, in the arrangement of the image pickup unit 21 shown in FIG. 3, the second reflection prism 35 is disposed laterally to reflect a light beam to the right side surface or the left side surface.

In a case of adopting any one of these arrangements, it is preferable that, of a plurality of image pickup devices, image pickup devices which are simultaneously activated be disposed on different surfaces of the light splitting element 21a.

The description has been made heretofore for an example where a light beam from the objective optical system 22 is split into two light beams. However, in a configuration where a light beam from the objective optical system 22 is split into three or more light beams, a configuration may be adopted where three or more image pickup devices are disposed at different positions with respect to the optical axis O of the light beam from the objective optical system 22.

According to the first embodiment having such a configuration, following advantageous effects can be obtained.

For example, for a configuration where a plurality of optical images having different optical path lengths are formed in different regions of a single image pickup device to pick up an image, it is preferable to use a large-sized image pickup device. However, the large-sized image pickup device requires a high cost, and restrictions are imposed on layout for accommodating the large-sized image pickup device in the distal end portion 11 of the endoscope 1. If a configuration is adopted where a plurality of images are picked up in different regions of a small-sized image pickup device, the number of pixels is reduced and pixel size is reduced, so that image quality is lowered. Accordingly, it is considered that there is a demand for disposing image pickup devices the number of which is equal to the number of images to be obtained in the distal end portion 11 of the endoscope 1.

However, the image pickup device activates a large number of pixels at a high clock rate and hence, the image pickup device forms a heat source (and further a noise source of electromagnetic noise or the like). In a case where a solid-state image pickup device is used as the image pickup device, it is known that an amount of noise generated in an image increases as a temperature increases. Therefore, it is preferable that, in the distal end portion 11 of the endoscope 1 which is required to have a reduced size, mutual thermal influence between the plurality of image pickup devices be prevented to avoid lowering of image quality.

In contrast, in the present embodiment, the first image pickup device 36 and the second image pickup device 38, which are disposed adjacent to the light splitting element 21a, are disposed at positions different from each other with respect to the optical axis O. With such a configuration, compared with a case where the first image pickup device 36 and the second image pickup device 38 are disposed adjacent to each other in the same plane, the first image pickup device 36 and the second image pickup device 38 can be more greatly separated with a distance. Accordingly, it is possible to reduce mutual thermal influence and noise between the first image pickup device 36 and the second image pickup device 38 and hence, image quality of an image to be obtained can be improved.

The second image pickup device 38 is disposed on a side opposite to the first image pickup device 36 with the optical axis O interposed between the second image pickup device 38 and the first image pickup device 36. In other words, the first image pickup surface of the first image pickup device 36 is disposed to face one of two surfaces of the light splitting element 21a, the two surfaces opposing each other with the optical axis O interposed between the two surfaces, and the second image pickup surface of the second image pickup device 38 is disposed to face the other of the two surfaces. With such a configuration, the first image pickup device 36 and the second image pickup device 38 can be separated with a distance as much as possible and hence, it is possible to further reduce thermal influence and noise.

The above-mentioned advantageous effects can be obtained by adjusting arrangement and orientation of the second reflection prism 35 such that the second reflection prism 35 reflects a light beam in a direction different from a direction in which the first image pickup device 36 is disposed. Accordingly, there is an advantage that an additional member or the like is unnecessary.

In a case where the second reflection prism 35 is disposed such that, as viewed from the center line C, the third surface 35c is disposed outward in the radial direction and the second surface 35b is disposed inward in the radial direction as shown in FIG. 3, the length of the large diameter portion of the distal end portion 11 is shortened and hence, bendability and ease of insertion can be increased.

Further, the second image pickup device 38 and the reflection mirror 34 are disposed adjacent to each other and hence, it is possible to prevent the image pickup unit 21 from increasing in size in different directions about the optical axis O.

Second Embodiment

Figure 6:
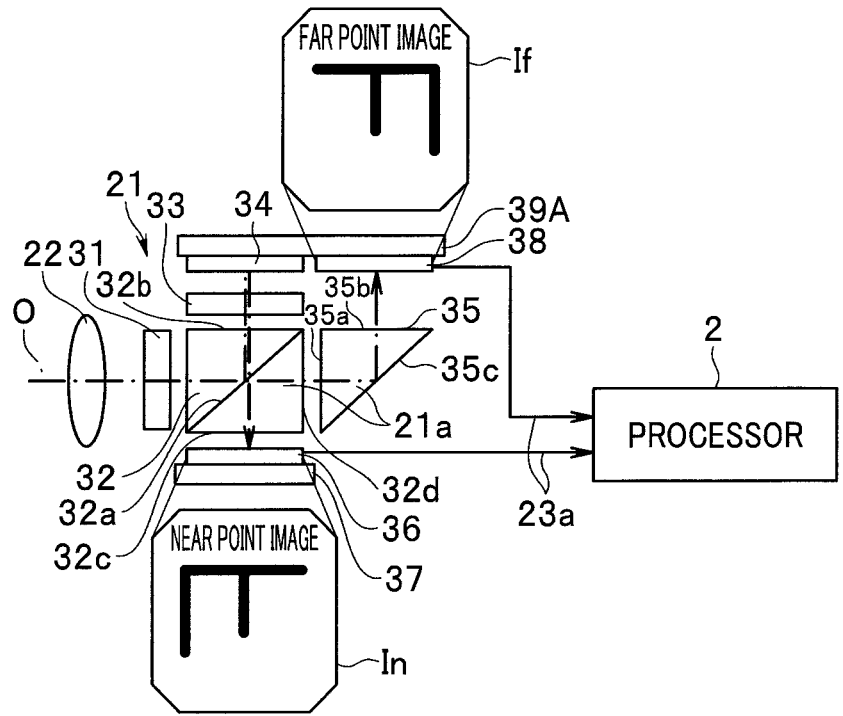
FIG. 6 is a view showing a constitutional example of an image pickup unit in a second embodiment of the present invention.

FIG. 6 is a view showing a second embodiment of the present invention, and shows a constitutional example of the image pickup unit 21. In the second embodiment, components substantially equal to the corresponding components in the above-mentioned first embodiment are given the same reference symbols, and repeated description of such components will be omitted when appropriate. Only, points which make the second embodiment different from the first embodiment will be mainly described.

In the above-mentioned first embodiment, the second image pickup device 38 mounted on the second substrate 39 and the reflection mirror 34 are individually attached to the light splitting element 21a. In contrast, in the second embodiment, the second image pickup device 38 and the reflection mirror 34 are mounted on a same single substrate.

In other words, the second image pickup device 38 and the reflection mirror 34 are mounted on a same substrate 39A at different positions in a direction of the optical axis O.

For the reflection mirror 34, an individual reflection mirror may be attached on the substrate 39A. However, it is preferable to have a reflection-mirror-processed surface on the substrate 39A.

According to the second embodiment having such a configuration, it is possible to obtain advantageous effects substantially equal to the advantageous effects of the above-mentioned first embodiment. Further, the second image pickup device 38 and the reflection mirror 34 are mounted on the same substrate 39A and hence, the second image pickup device 38 and the reflection mirror 34 can be attached to the light splitting element 21a with one work step.

Further, by using the reflection-mirror-processed surface on the substrate 39A as the reflection mirror 34, the number of parts can be reduced, thus reducing an arrangement space and hence, the distal end portion 11 can be reduced in size.

Third Embodiment

Figure 7:
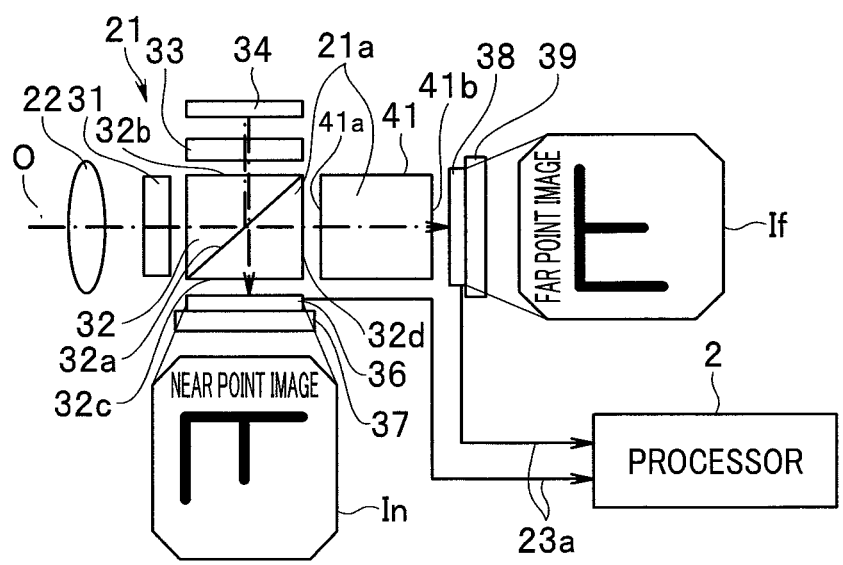
FIG. 7 is a view showing a constitutional example of an image pickup unit in a third embodiment of the present invention.

FIG. 7 is a view showing a third embodiment of the present invention, and shows a constitutional example of the image pickup unit 21. In the third embodiment, components substantially equal to the corresponding components in the above-mentioned first and second embodiments are given the same reference symbols, and repeated description of such components will be omitted when appropriate. Only points which make the third embodiment different from the first and second embodiments will be mainly described.

In the first and second embodiments, the second reflection prism 35 is provided which reflects a second light beam which is allowed to pass through the first reflection prism 32.

In the third embodiment, a transparent block 41 is provided instead of the second reflection prism 35, The transparent block 41 allows a second light beam, which is allowed to pass through the first reflection prism 32, to pass through the transparent block 41 to form an image on the second image pickup device 38. Accordingly, the light splitting element 21a in the present embodiment includes the first reflection prism 32 and the transparent block 41. The transparent block 41 is formed by using a transparent optical material with a predetermined refractive index into a hexahedron shape, such as a cube or a rectangular parallelepiped shape where a length in a direction of the optical axis O differs from a length of a cube in the direction of the optical axis O.

In FIG. 7, the first reflection prism 32 and the transparent block 41 are separately shown. However, in an actual product, the second light emitting surface 32d of the first reflection prism 32 and a light incident surface 41a of the transparent block 41 are bonded by a transparent adhesive agent with a predetermined refractive index, for example.

In the present embodiment, the second image pickup device 38 mounted on the second substrate 39 is disposed at a position which receives a second light beam which is allowed to pass through the transparent block 41. Specifically, the second image pickup device 38 is bonded to a light emitting surface 41b of the transparent block 41 by adhesion or the like. With such a configuration, the first image pickup surface of the first image pickup device 36 and the second image pickup surface of the second image pickup device 38 are perpendicular to each other.

The transparent block 41 serves as an optical path length changing element which causes at least one light beam of a plurality of light beams to have a different optical path length, the plurality of light beams being obtained through splitting by the light splitting element 21a. The transparent block 41 emits a second light beam that is to be incident on the second image pickup device 38 in a state where a second optical path length of the second light beam is different from a first optical path length of a first light beam which is incident on the first image pickup device 36. At this point of operation, a difference between the first optical path length and the second optical path length may be adjusted by changing a refractive index of the transparent block 41, may be adjusted by changing a length of the transparent block 41 in a direction of the optical axis O, or may be adjusted by changing both the refractive index of the transparent block 41 and the length of the transparent block 41 in the direction of the optical axis O.

However, it is not always necessary for the transparent block 41 to also serve as the optical path length changing element. Another optical path length changing element, such as a transparent plate or a transparent sheet, may be added. The optical path length changing element may be provided on either one of an optical path of a first light beam or an optical path of a second light beam, or may be provided on each of both the optical path of the first light beam and the optical path of the second light beam. Needless to say, the optical path length changing element may be provided in a configuration of another embodiment.

In the configuration of the present embodiment, a light beam that is to be incident on the first image pickup device 36 is reflected on the polarization beam splitter surface 32a and the reflection mirror 34, that is, reflected two times, but a light beam that is to be incident on the second image pickup device 38 is allowed to pass through the first reflection prism 32 and the transparent block 41, thus not being reflected (the number of reflection is zero). Therefore, there is no possibility that an optical image which is formed on the first image pickup device 36 is horizontally inverted compared to an optical image which is formed on the second image pickup device 38 and hence, inversion processing performed by the processor 2 is unnecessary.

According to the third embodiment having such a configuration, also by providing the transparent block 41 instead of the second reflection prism 35, the first image pickup device 36 and the second image pickup device 38 can be separated from each other with a distance by disposing the first image pickup device 36 and the second image pickup device 38 at positions different from each other with respect to the optical axis O. Accordingly, substantially in the same manner as the above-mentioned first and second embodiments, thermal influence and noise can be reduced and hence, image quality of an image can be improved.

Further, by causing the transparent block 41 to also serve as the optical path length changing element, it is unnecessary to additionally provide an optical path length changing element and hence, a configuration can be simplified.

Further, the number of reflection of each of two optical images is an even number and hence, inversion processing performed by the processor 2 is unnecessary whereby a processing load of the processor 2 is reduced and a processing time lag can be shortened.

The second image pickup device 38, the second substrate 39, and the signal line 23a connected to the second substrate 39 are disposed on a proximal end side of the light splitting element 21a. Therefore, compared with a configuration where the second image pickup device 38, the second substrate 39, and the signal line 23a are disposed on an upper side of the light splitting element 21a, it is possible to prevent the image pickup unit 21 from increasing in size in a vertical direction. Accordingly, it is possible to approximate a dimension of the image pickup unit 21 in the vertical direction to a dimension of the image pickup unit 21 in a lateral direction and hence, it is possible to increase the degree of freedom in layout of the image pickup unit 21 in the distal end portion 11 to some extent.

Fourth Embodiment

Figure 8:
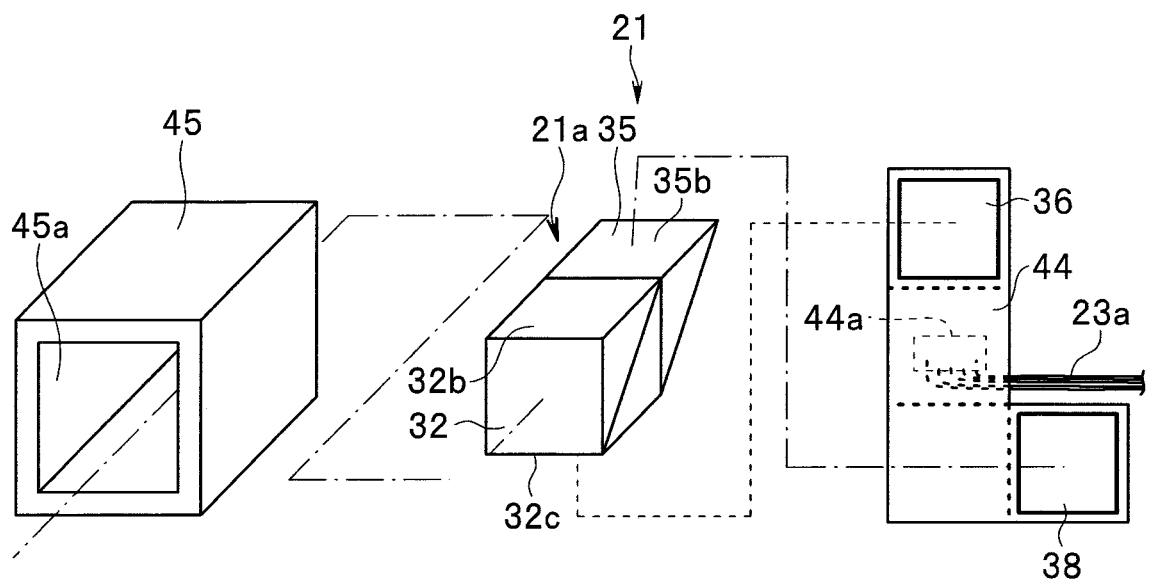
FIG. 8 is an exploded perspective view showing a configuration of an image pickup unit in a fourth embodiment of the present invention.
Figure 9:
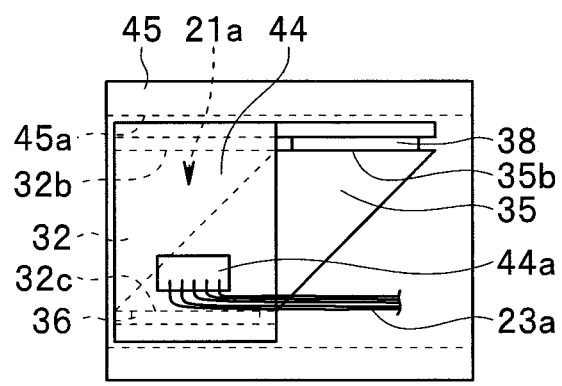
FIG. 9 is a view showing a configuration of the image pickup unit in the fourth embodiment of the present invention in an assembled state as viewed in a side view in a see-through manner.

FIG. 8 and FIG. 9 are views showing a fourth embodiment of the present invention, wherein FIG. 8 is an exploded perspective view showing a configuration of the image pickup unit 21, and FIG. 9 is a view showing a configuration of the image pickup unit 21 in an assembled state as viewed in a side view in a see-through manner. In the fourth embodiment, components substantially equal to the corresponding components in the above-mentioned first to third embodiments are given the same reference symbols, and repeated description of such components will be omitted when appropriate. Only points which make the fourth embodiment different from the first to third embodiments will be mainly described.

In the above-mentioned first to third embodiments, the first image pickup device 36 and the second image pickup device 38 are respectively mounted on different substrates. In contrast, in the fourth embodiment, the first image pickup device 36 and the second image pickup device 38 are mounted on a same substrate.

As shown in FIG. 8, the image pickup unit 21 includes the light splitting element 21a, a flexible printed circuit board 44, and a casing 45.

The flexible printed circuit board 44 is formed into an L shape, for example, to cover a lower surface, a right side surface, and an upper surface of the first reflection prism 32 and an upper surface of the second reflection prism 35 in a viewing direction as FIG. 8 is viewed. The flexible printed circuit board 44 is foldable at three positions shown by dotted lines.

The first image pickup device 36 and the second image pickup device 38 are mounted on the same surface of the same flexible printed circuit board 44 at different portions. In other words, the first image pickup device 36 is mounted on the flexible printed circuit board 44 at a position which corresponds to the lower surface of the first reflection prism 32 (an upper position of the L shape), and the second image pickup device 38 is mounted on the flexible printed circuit board 44 at a position which corresponds to the upper surface of the second reflection prism 35 (a right position of the L shape).

Further, a land 44a is provided to the flexible printed circuit board 44 on a surface disposed on a side opposite to the surface on which the first image pickup device 36 and the second image pickup device 38 are mounted, at a position which corresponds to the right side surface of the first reflection prism 32 (a center position of the L shape). The land 44a is provided for connecting the signal lines 23a.

The casing 45 is formed into a rectangular cylindrical (angular cylindrical) shape, for example, and has an accommodation hole 45a on an inner side of the rectangular cylindrical shape. The accommodation hole 45a accommodates the light splitting element 21a around which the flexible printed circuit board 44 is disposed. FIG. 8 shows a rectangular cylinder having corners on an outer surface. However, it is preferable that an actual casing 45 accommodated in the distal end portion body 20 have a shape obtained through chamfering of corners on an outer surface of an angular cylinder or a shape approximating a circular cylinder obtained through rounding of an outer surface.

At least a portion of the casing 45 may be made of metal. In this case, the metal portion of the casing 45 can release heat which is generated from the first image pickup device 36 and the second image pickup device 38 to other portions of the endoscope 1 by conduction of the heat. Further, a ground line of the first image pickup device 36 and a ground line of the second image pickup device 38 may be connected to the metal portion of the casing 45.

The flexible printed circuit board 44 is disposed around the light splitting element 21a in a state of being folded at three folding portions with the surface on which the first image pickup device 36 and the second image pickup device 38 are mounted being inside. With such a configuration, the first image pickup device 36 and the second image pickup device 38 are bonded to the light splitting element 21a in a state where the first image pickup surface of the first image pickup device 36 is disposed to face one surface (the first light emitting surface 32c in the present embodiment) of two surfaces of the light splitting element 21a, the two surfaces opposing each other with the optical axis O of the light beam from the objective optical system 22 interposed between the two surfaces, and the second image pickup surface of the second image pickup device 38 is disposed to face the other surface (a surface including the light emitting/incident surface 32b and the second surface 35h in the present embodiment) of the two surfaces.

FIG. 8 and FIG. 9 show an example of the flexible printed circuit board 44 configured such that the first image pickup device 36 and the second image pickup device 38 are disposed to face the upper surface and the lower surface of the light splitting element 21a. However, the flexible printed circuit board 44 may be configured such that the first image pickup device 36 is disposed on the upper surface or the lower surface of the light splitting element 21a, and the second image pickup device 38 is disposed on the right side surface or the left side surface of the light splitting element 21a.

The signal lines 23a are soldered to the land 44a of the flexible printed circuit board 44 attached to the light splitting element 21a, and the signal lines 23a are conducted to the first image pickup device 36 and the second image pickup device 38. The land 44a is disposed at a position which corresponds to the side surface of the light splitting element 21a (a surface different from the surface on which the first image pickup device 36 and the second image pickup device 38 are disposed), and the signal lines 23a are caused to extend in a direction toward the proximal end from the side surface of the light splitting element 21a.

The land 44a and the signal lines 23a may be connected with each other by using a conductive adhesive agent instead of connecting by soldering. Further, a connector may be used to connect the flexible printed circuit board 44 and the signal lines 23a with each other instead of the land 44a.

The flexible printed circuit board 44 is bonded to the light splitting element 21a, and the signal lines 23a are connected to the flexible printed circuit board 44. The flexible printed circuit board 44 is accommodated in the accommodation hole 45a of the casing 45. With such a configuration, the light splitting element 21a and the flexible printed circuit board 44 which is disposed around the light splitting element 21a are covered by the casing 45. Accordingly, even if the distal end portion 11 moves, the flexible printed circuit board 44 is held in a non-movable manner and hence, there is no possibility of the flexible printed circuit board 44 coming into contact with a member disposed outside the casing 45. Therefore, it is possible to prevent breakage of the flexible printed circuit board 44.

To further prevent breakage of the flexible printed circuit board 44 and the light splitting element 21*a* at the time of using the endoscope 1, an adhesive agent, an elastic sheet made of resin, rubber or the like, or an impact absorbing material, such as sponge, may be provided in the casing 45.

The casing 45 may be configured such that, for example, three surfaces of four surfaces consisting of an upper surface, a lower surface, a left surface, and a right surface form a receiving member, and one remaining surface forms a lid member which is separated from the receiving member. In this case, it is preferable to adopt a structure where, in a state where the lid member is open, the light splitting element 21*a* and the flexible printed circuit board 44 are accommodated in the receiving member at predetermined positions and, thereafter, the lid member is closed and fixed by adhesion to the receiving member whereby the flexible printed circuit board 44 is disposed at a predetermined position with respect to the light splitting element 21*a*. The lid member may be fixed to the receiving member by recess-projection fitting, such as snap fit, instead of adhesion. As described above, the signal lines 23*a* may use waveguides which are formed by covering a silicone resin, forming a core, with a conductive foil or a braided wire.

According to the fourth embodiment having such a configuration, it is possible to obtain advantageous effects substantially equal to the advantageous effects of the above-mentioned first to third embodiments. Further, a configuration is adopted where the first image pickup device 36 and the second image pickup device 38 face the light splitting element 21*a* when the flexible printed circuit board 44 is disposed around the light splitting element 21*a* with the first image pickup device 36 and the second image pickup device 38 mounted on the flexible printed circuit board 44. Accordingly, assembly is facilitated.

In such a configuration, the signal lines 23*a* are caused to extend from the surface different from the surface on which the first image pickup device 36 and the second image pickup device 38 are disposed and hence, it is possible to prevent the image pickup unit 21 from increasing a size in the vertical direction. Accordingly, it is possible to approximate a dimension of the image pickup unit 21 in the vertical direction to a dimension of the image pickup unit 21 in the lateral direction and hence, it is possible to increase the degree of freedom in layout of the image pickup unit 21 in the distal end portion 11 to some extent.

Further, the casing 45 is provided and hence, it is possible to prevent breakage of the flexible printed circuit board 44, and it is possible to prevent the image pickup unit 21 from having a large difference in dimension between the vertical direction and the lateral direction.

Having described the preferred embodiments of the invention referring to the accompanying drawings, it should be understood that the present invention is not limited to those precise embodiments and various changes and modifications thereof could be made by one skilled in the art without departing from the spirit or scope of the invention as defined in the appended claims.

What is claimed is:

1. An endoscope comprising:
    an insertion portion;
    an objective lens configured to form light into a light beam along an optical axis;
    a light splitting element configured to split the light beam into a first light beam and a second light beam;
    a reflection mirror configured to reflect the first light beam;
    a first image pickup sensor on which an image of the first light beam reflected by the reflection mirror is formed; and
    a second image pickup sensor on which an image of the second light beam from the light splitting element is formed,
    wherein the light splitting element comprises:
        a first surface configured to emit the first light beam in a first direction towards the reflection mirror; and
        a reflection prism comprising:
            a perpendicular surface being perpendicular to the optical axis;
            a parallel surface being disposed along the optical axis; and
            a second surface that is an inclined surface disposed to be inclined with respect to the optical axis, the second surface being arranged downstream of the first surface along the optical axis, configured to emit the second light beam in the first direction towards the second image pickup sensor,
    wherein the optical axis is disposed to be offset from a center line of a distal end portion of the insertion portion, and
    wherein the reflection prism is disposed such that, as viewed from the center line, the inclined surface is disposed outward in a radial direction and the parallel surface is disposed inward in the radial direction.

2. The endoscope according to claim 1,
    wherein the second image pickup sensor is disposed on a side opposite to the first image pickup sensor with respect to the optical axis of the light beam from the objective lens.

3. The endoscope according to claim 2,
    wherein the light splitting element further comprises a plurality of triangular prisms, wherein the first surface is part of the plurality of triangular prisms, and
    wherein the second surface is configured to reflect the second light beam, which is allowed to pass through the plurality of triangular prisms, in a direction different from a direction in which the first image pickup sensor is disposed.

4. The endoscope according to claim 2,
    wherein a first image pickup surface of the first image pickup sensor is disposed to face one surface of two surfaces of the light splitting element, the two surfaces opposing each other with the optical axis of the light beam from the objective lens interposed between the two surfaces, and a second image pickup surface of the second image pickup sensor is disposed to face another surface of the two surfaces.

5. The endoscope according to claim 4,
    wherein the second image pickup sensor and the reflection mirror are disposed adjacent to each other.

6. The endoscope according to claim 5,
    wherein the second image pickup sensor and the reflection mirror are mounted on a same substrate.

7. The endoscope according to claim 1,
    wherein the first image pickup sensor and the second image pickup sensor are respectively mounted on a same flexible printed circuit board at different portions, and the flexible printed circuit board is disposed around the light splitting element, so that the first image pickup sensor and the second image pickup sensor face the light splitting element.

8. The endoscope according to claim 7, wherein a first image pickup surface of the first image pickup sensor is disposed to face one surface of two surfaces of the light splitting element, the two surfaces opposing each other with the optical axis of the light beam from the objective lens interposed between the two surfaces, a second image pickup surface of the second image pickup sensor is disposed to face another surface of the two surfaces, and a signal line which is conducted to the first image pickup sensor and the second image pickup sensor extends from a surface different from a surface on which the first image pickup sensor and the second image pickup sensor are disposed.

9. The endoscope according to claim 7, further comprising a casing configured to cover the light splitting element and the flexible printed circuit board which is disposed around the light splitting element.

10. The endoscope according to claim 1, further comprising:
a processor configured to generate a first image from a first image pickup signal obtained through image pickup performed by the first image pickup sensor, generate a second image from a second image pickup signal obtained through image pickup performed by the second image pickup sensor and combine the first image and the second image with each other.

11. The endoscope according to claim 10, wherein a first optical path length from the objective lens to the first image pickup sensor is different from a second optical path length from the objective lens to the second image pickup sensor, and
wherein the processor is configured to generate a composite image with a larger depth of field than the first image and the second image by combining the first image and the second image such that the composite image includes a focused portion in the first image and a focused portion in the second image, the focused portion in the second image being different from the focused portion in the first image in respect of a focused region.

12. The endoscope according to claim 11, wherein the processor is configured to:
perform aligning a direction of the first image and a direction of the second image; and
combine the first image and the second image with each other after performing aligning the direction of the first image and the direction of the second image.

* * * * *